(12) United States Patent
Kamada et al.

(10) Patent No.: US 10,539,745 B2
(45) Date of Patent: Jan. 21, 2020

(54) OPTICAL CONNECTOR

(71) Applicants: SEI OPTIFRONTIER CO., LTD., Yokohama-shi, Kanagawa (JP); Sadawo Oki, Nagoya-shi, Aichi (JP)

(72) Inventors: Tsutomu Kamada, Kanagawa (JP); Kenichiro Ohtsuka, Kanagawa (JP); Yuji Suzuki, Kanagawa (JP); Motoyoshi Kimura, Aichi (JP); Yoshinobu Oki, Aichi (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/508,123

(22) PCT Filed: Sep. 9, 2015

(86) PCT No.: PCT/JP2015/075622
§ 371 (c)(1),
(2) Date: Mar. 2, 2017

(87) PCT Pub. No.: WO2016/039383
PCT Pub. Date: Mar. 17, 2016

(65) Prior Publication Data
US 2017/0254961 A1 Sep. 7, 2017

(30) Foreign Application Priority Data

Sep. 12, 2014 (JP) ................. 2014-186814
Nov. 5, 2014 (JP) ................. 2014-225363

(51) Int. Cl.
*G02B 6/38* (2006.01)
(52) U.S. Cl.
CPC ......... *G02B 6/3825* (2013.01); *G02B 6/3821* (2013.01); *G02B 6/3885* (2013.01); *G02B 6/3887* (2013.01); *G02B 6/3893* (2013.01)

(58) Field of Classification Search
CPC .. G02B 6/3825; G02B 6/3821; G02B 6/3885; G02B 6/3887; G02B 6/3893
See application file for complete search history.

(56) References Cited

U.S. PATENT DOCUMENTS 5,031,981 A * 7/1991 Peterson .............. G02B 6/3887
385/56
5,146,813 A * 9/1992 Stanfill, Jr. ............... B25B 9/00
81/111

(Continued)

FOREIGN PATENT DOCUMENTS

JP 2004-093828 3/2004
JP 2004-102072 A 4/2004

(Continued)

*Primary Examiner* — Chris H Chu
(74) *Attorney, Agent, or Firm* — Drinker Biddle & Reath LLP

(57) ABSTRACT

An optical connector 1 is an optical connector connected to an external optical adapter. The optical connector 1 is provided with: an inner housing 3, in a surface of which engaging holes for engaging the optical adapter is provided; a boot 6 connected to the inner housing 3 on a side opposite the optical adapter in a forward/backward direction; and a first outer housing 4 and a second outer housing 5 covering the engaging holes and mounted on the inner housing 3 to be freely movable in the forward/backward direction. As the second outer housing 5 moves backward, the engaging holes of the inner housing 3 are exposed. The second outer housing 5 has cutout parts 5c which are cut out from a back end surface 5f in the forward direction and which a front end part of the boot 6 enters.

4 Claims, 12 Drawing Sheets

(56) References Cited

U.S. PATENT DOCUMENTS

| | | | | |
|---|---|---|---|---|
| 6,817,272 B2* | 11/2004 | Holland | ............... | H01R 43/26 |
| | | | | 439/304 |
| 8,559,781 B2 | 10/2013 | Childers et al. | | |
| 8,869,661 B2* | 10/2014 | Opstad | ............... | H01R 13/443 |
| | | | | 81/487 |
| 2013/0183004 A1 | 7/2013 | Hughes et al. | | |
| 2015/0212283 A1* | 7/2015 | Jiang | ............... | G02B 6/3893 |
| | | | | 385/77 |

FOREIGN PATENT DOCUMENTS

| | | |
|---|---|---|
| JP | 2012-058320 A | 3/2012 |
| TW | M480682 | 6/2014 |

* cited by examiner (a)

(b)

(a)

(b)

OPTICAL CONNECTOR

TECHNICAL FIELD

The present invention relates to an optical connector.

BACKGROUND ART

An optical connector inserted into or extracted from an optical connector adapter is described in Patent Literature 1. This optical connector is provided with a connector main body that holds a ferrule attached to a tip of an optical fiber, a coupling that is movable backward and forward relative to the connector main body, a coupling engagement member that is provided in the rear of the connector main body, a boot that extends rearward from the coupling engagement member, and a handling stick that extends rearward.

In this optical connector, when the handling stick is pushed forward, the coupling engagement member and the connector main body move forward, and latches of the optical connector adapter are engaged with the connector main body. Thereby, the optical connector is connected to the optical connector adapter. When the handling stick is pulled backward, the coupling engagement member and the coupling move backward. As the engagement of the latches is released, the optical connector is pulled out of the optical connector adapter.

CITATION LIST

Patent Literature

Patent Literature 1: Japanese Unexamined Patent Publication No. 2012-58320

SUMMARY OF INVENTION

Technical Problem

In the aforementioned optical connector, the connector main body, the coupling, the coupling engagement member, and the boot extend long in a forward/backward direction. Therefore, when the optical connector is inserted/extracted or is in a mounted state, bending stress and tensile stress applied to the optical connector are easily increased, and problems such as breakage may be caused. An expensive material should also be used to avoid these problems such as breakage, and there is also a problem that costs of a material or the like are high.

An aspect of the present invention is intended to provide an optical connector capable of achieving a reduction in length

Solution to Problem

An optical connector according to an aspect of the present invention is an optical connector connected to an external optical adapter in a given connecting direction. The optical connector includes: an inner housing, on a surface of which engaging parts for engaging the optical adapter are provided; a boot connected to the inner housing in the connecting direction on a side opposite the optical adapter; and an outer housing configured to cover the engaging parts and mounted on the inner housing to be freely movable in the connecting direction. As the outer housing moves to the boot side in the connecting direction, the engaging parts are exposed. The outer housing has cutout parts which are cut out in the connecting direction from the end part of the boot side and which a part of the boot enters.

Advantageous Effects of Invention

According to the present invention, it is possible to realize a reduction in length.

BRIEF DESCRIPTION OF DRAWINGS

FIG. 11 is a view illustrating a grip part and a third outer housing, wherein
FIG. 11(a) is a perspective view of the grip part and FIG. 11(b) is a perspective view of the third outer housing.
FIG. 12 is a view illustrating the optical connector and the grip part, wherein
FIG. 12(a) is a perspective view illustrating a state before the grip part is engaged and FIG. 12(b) is a perspective view illustrating a state in which the grip part is engaged.

DESCRIPTION OF EMBODIMENTS

Figure 1:
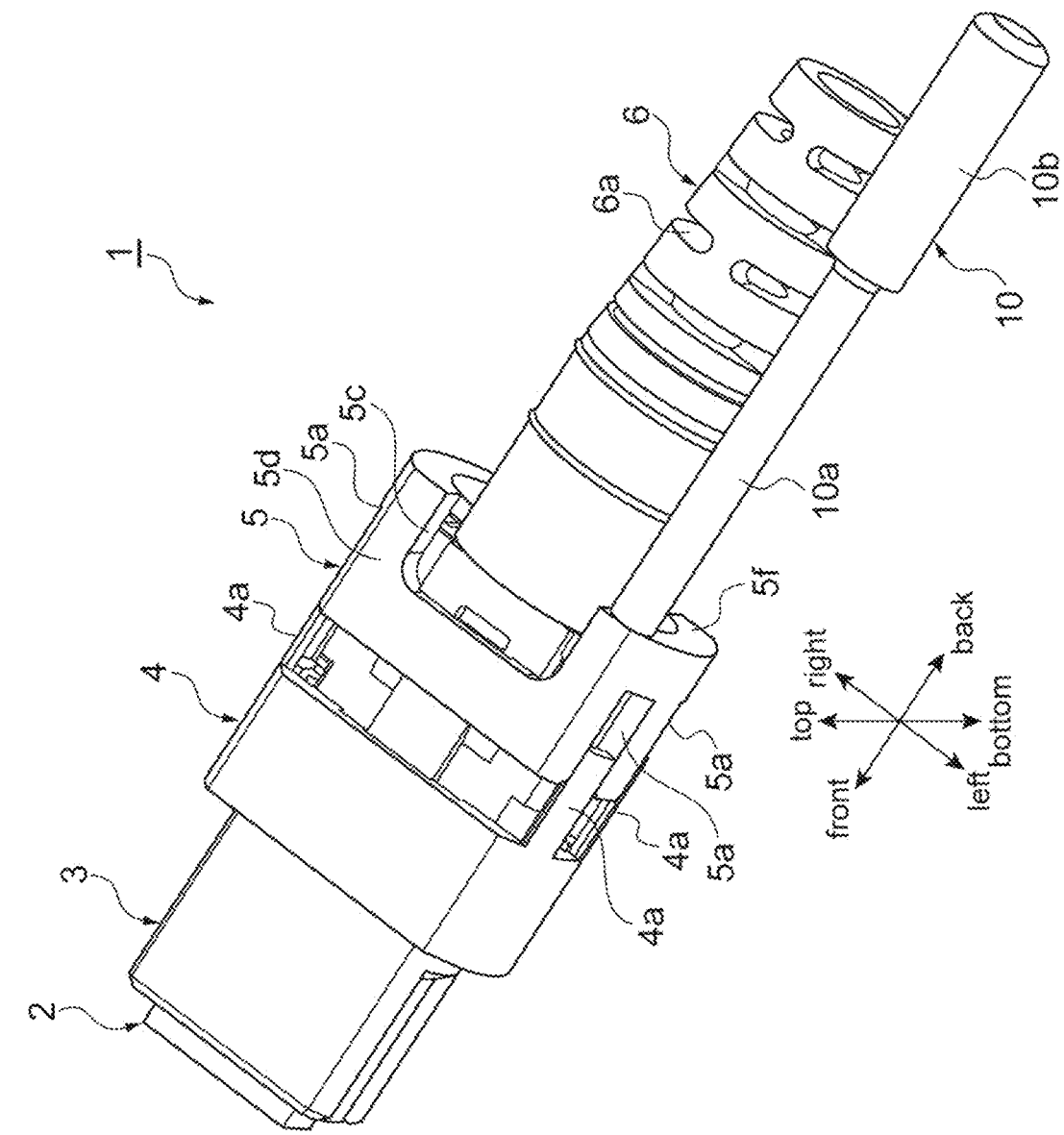
FIG. 1 is a perspective view illustrating an optical connector according to a first embodiment.

Description of Embodiments of the Present Invention

First, contents of embodiments of the present invention will be listed and described. (1) An optical connector according to an aspect of the present invention is an optical connector connected to an external optical adapter in a given connecting direction. The optical connector includes: an inner housing, on a surface of which engaging parts for engaging the optical adapter are provided; a boot connected to the inner housing in the connecting direction on a side opposite the optical adapter; and an outer housing configured to cover the engaging parts and mounted on the inner housing to be freely movable in the connecting direction. The engaging parts are exposed as the outer housing moves to the boot side in the connecting direction. The outer housing has cutout parts which are cut out in the connecting direction from the end part of the boot side and which a part of the boot enters.

In the optical connector according to the aspect of the present invention, a part of the boot is configured to enter the cutout parts of the outer housing. In this way, as a part of the boot enters the cutout parts, a length of the outer housing in the connecting direction can be reduced. As a result, the inner housing and a rear housing can also be reduced in length, and a reduction in length of the optical connector can be realized. With the reduction in length of the optical connector, bending stress and tensile stress applied to the optical connector can be reduced. Therefore, costs of materials or the like for the optical connector can be reduced.

(2) In the optical connector, the outer housing may be made up of a first outer housing configured to cover the engaging parts, and a second outer housing provided on the boot side of the first outer housing and provided to be freely movable relative to the first outer housing in the connecting direction. When the second outer housing moves in a direction approaching the first outer housing, the engaging parts may be exposed by relative movement of the second outer housing and the inner housing relative to the first outer housing. When the second outer housing moves in a direction away from the first outer housing, the engaging parts may be exposed by relative movement of the second outer housing and the first outer housing relative to the inner housing. The second outer housing may include a grip part extending in a direction away from the second outer housing.

In the optical connector, the first outer housing and the second outer housing are independently provided, and the second outer housing is configured to be freely movable relative to the first outer housing in the connecting direction. When the second outer housing moves in the direction approaching the first outer housing, the second outer housing and the inner housing move together, and the engaging parts are exposed. Therefore, the external optical adapter can be engaged with the engaging parts. When the second outer housing moves away from the first outer housing, the second outer housing and the first outer housing move together, and the engaging parts are exposed. Therefore, as the engagement of the optical adapter at the engaging parts is released, the optical connector can be demounted from the optical adapter. In this way, since the mounting/demounting of the optical connector on/from the optical adapter can be performed by merely displacing the second outer housing, the operability of the mounting/demounting can be improved. The grip part extending from the second outer housing is provided for the optical connector. Therefore, as the grip part is gripped and handled, the second outer housing can be displaced from a more distant place. In this way, since the second outer housing can be displaced by the grip part, the mounting/demounting with respect to the optical adapter can be more easily performed.

(3) In the optical connector, one end of the grip part may extend up to a position away from the second outer housing relative to one end of the boot. In this case, since the grip part can be gripped at the position away from the second outer housing, the handleability of the grip part can be improved.

(4) In the optical connector, the grip part may include a rod-like extension part that is fixed to the second outer housing and extends in the direction away from the second outer housing, and a handling part that is expanded with respect to the extension part. In this case, the handling part can be easily gripped.

(5) In the optical connector, the grip part may be configured to be freely mounted/demounted on/from the second outer housing. In this case, when not required, the grip part can be demounted from the second outer housing.

(6) In the optical connector, the grip part may be mounted/demounted on/from the second outer housing by rotation.

(7) In the optical connector, the grip part may include two engaging parts engaged with the second outer housing in the connecting direction. The second outer housing may include two engaged parts engaged with the respective two engaging parts, and the two engaged parts may be provided on both sides of the cutout parts. In the optical connector, the grip part can be engaged with the second outer housing in the connecting direction. In this way, the grip part is engaged and mounted on the second outer housing. Accordingly, the mounted grip part can be gripped to easily displace the second outer housing in the connecting direction. The engaged parts of the second outer housing are provided on both sides of the cutout parts which the boot enters. Therefore, the mounted grip part can be pushed or pulled in a well-balanced manner. Accordingly, the mounting/demounting operation of the optical connector on/from the optical adapter can be more smoothly performed.

(8) In the optical connector, the grip part may extend in the connecting direction and, when the grip part is cut along a cross section perpendicular to the connecting direction, a shape thereof may have a circular arc shape. In this case, since the grip part has a vertically divided cylindrical shape extending in the connecting direction, the grip part can be mounted on the boot from the side.

(9) In the optical connector, the grip part may include a diameter reduced part whose diameter is smaller than surrounding portions, and a diameter increased part whose diameter is gradually increased from the diameter reduced part. The grip part can be formed in an easily gripped shape by the diameter reduced part.

(10) In the optical connector, the first outer housing may have one of claw parts and slits, and the second outer housing may have the other of the claw parts and the slits. The second outer housing may be configured to be freely movable relative to the first outer housing in a state in which the claw parts are engaged with the slits.

Details of the Embodiments of the Present Invention

Specific examples of the optical connector according to the embodiment of the present invention will be described with reference to the drawings. The present invention is not limited to these examples, is defined by the claims, and is intended that all modifications are included in a scope equivalent to the claims. In the following description, the same elements as in the description of the drawings are given the same signs, and duplicate description will be omitted.

First Embodiment

Figure 2:
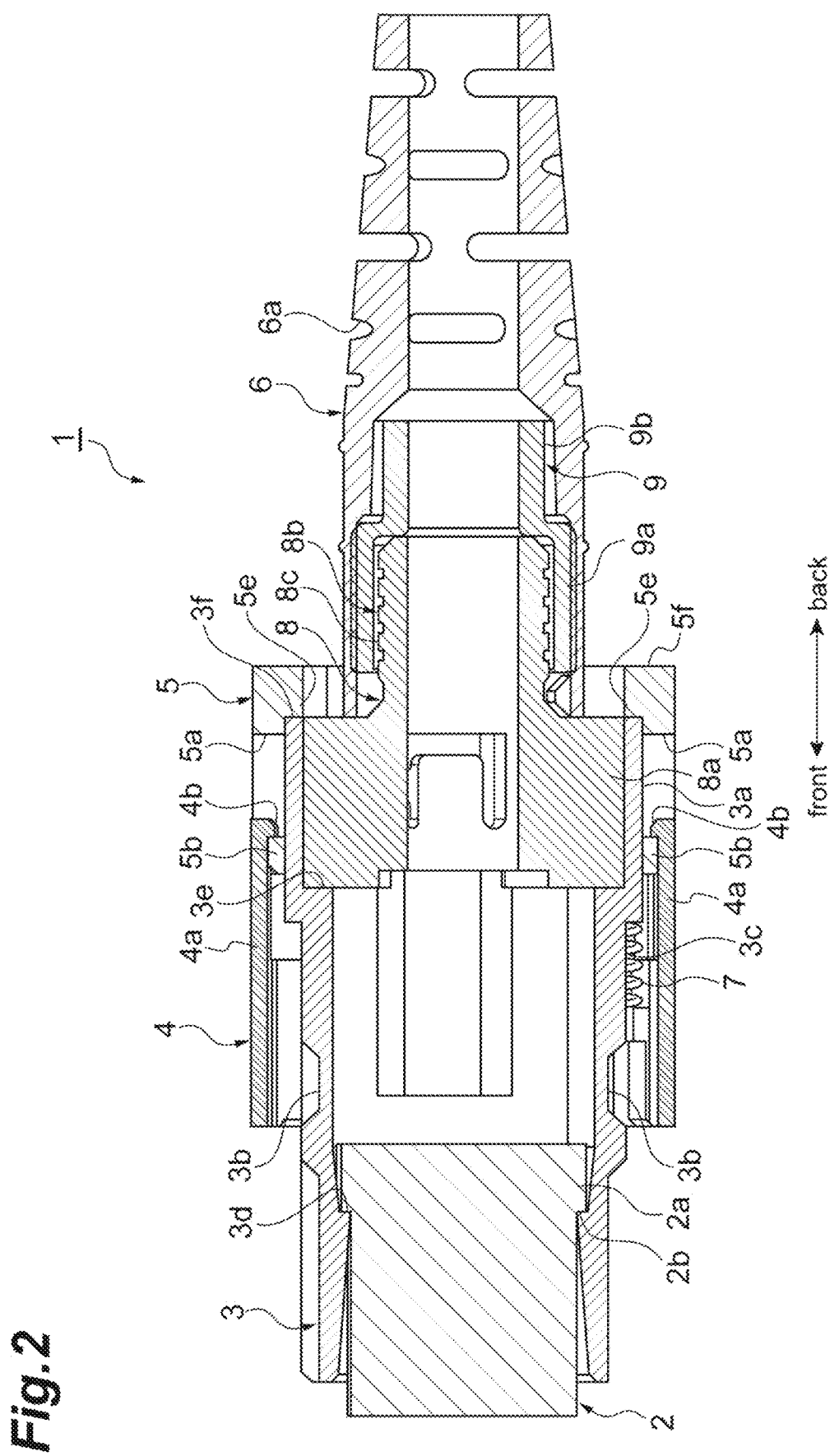
FIG. 2 is a longitudinal sectional view illustrating the optical connector of FIG. 1.

FIG. 1 is a perspective view illustrating an optical connector 1 according to a first embodiment. FIG. 2 is a longitudinal sectional view illustrating the optical connector 1. The optical connector 1 is an MPO connector. The optical connector 1 is a connector connected to an external optical adapter.

As illustrated in FIGS. 1 and 2, the optical connector 1 is provided with a rectangular ferrule 2 that is located at one end of the optical connector 1, an inner housing 3 that covers the ferrule 2, first and second outer housings 4 and 5 that cover a part of the inner housing 3, a boot 6 that is connected to the inner housing 3, and a rod-like grip part 10 that is connected to the second outer housing 5 as an appearance constitution. Coil springs 7, a rear housing 8, a caulking ring 9, and a ferrule spring (not shown) are provided inside the optical connector 1. In FIG. 2, illustration of the grip part 10 is omitted.

Hereinafter, for convenience of description, "front," "back," "top," "bottom," "left," and "right" and a direction are defined and described. A connecting direction between the inner housing 3 and the boot 6 is defined as a forward/backward direction. That is, a direction in which the inner housing 3 is viewed from the boot 6 is defined as a front, and a direction opposite to that direction is defined as a back. A longitudinal direction of a front surface of the ferrule 2 is defined as a leftward/rightward direction, and a transverse direction of the front surface of the ferrule 2 is defined as an upward/downward direction. These directions are merely for convenience of description, and do not limit the scope of the present invention.

The ferrule 2 is formed in a box shape having an expansion part 2a at a back side thereof. A plurality of fiber holes extending in the forward/backward direction are formed inside the ferrule 2. Optical fibers constituting a fiber cord inserted from the back of the boot 6 are inserted into the respective fiber holes. A front surface 2b of the expansion part 2a serves as a contact surface that is brought into contact with the inner housing 3. A ferrule spring biasing the ferrule 2 forward is provided between the ferrule 2 and the rear housing 8.

The inner housing 3 is formed in a stepped angled tube shape having an expansion part 3a at a back side. A pair of left and right engaging holes (engaging parts) 3b with which latches of the external optical adapter are engaged, and groove parts 3c in which the coil springs 7 biasing the first outer housing 4 forward are housed are provided for an outer surface of the inner housing 3. The engaging holes 3b are provided in the surface of the inner housing 3. The engaging holes 3b are formed in the outer surface of the inner housing 3, for example, in a trapezoidal shape. As the latches of the optical adapter are fitted into the respective engaging holes 3b, the optical connector 1 is engaged with the optical adapter in the forward/backward direction, and is mounted on the optical adapter. The groove parts 3c extend in the forward/backward direction. The coil springs 7 which can be expanded and contracted in the forward/backward direction are housed in the groove parts 3c.

The ferrule 2 and the rear housing 8 are housed inside the inner housing 3. An inner surface of the inner housing 3 is formed in a stepped shape. A contact surface 3d with which the ferrule 2 is brought into contact and a contact surface 3e with which a front end surface of the rear housing 8 is brought into contact are provided on an inner side of the inner housing 3. The front surface 2b of the expansion part 2a biased forward by the ferrule spring is brought into contact with the contact surface 3d.

The first outer housing 4 is attached on an outer side of the inner housing 3 to be freely movable in the forward/backward direction. The first outer housing 4 has a tubular shape. A cross section of the first outer housing 4 is formed in a curved shape such that short sides of a rectangle bulge outward.

Four claw parts 4a engaged with the second outer housing 5 are provided at the back of the first outer housing 4. Each of the claw parts 4a has a shape extending backward by a given length. The first outer housing 4 is provided with a pair of top and bottom claw parts 4a on a left side thereof, and is also provided with a pair of top and bottom claw parts 4a on a right side thereof. A contact part 4b brought into contact with the second outer housing 5 is provided at a back end of each of the claw parts 4a. The contact parts 4b have shapes protruding inward at the back ends of the claw parts 4a.

The second outer housing 5 is configured to be freely movable relative to the first outer housing 4 in the forward/backward direction at the back of the first outer housing 4. The second outer housing 5 is separated from the first outer housing 4. The second outer housing 5 has a tubular shape. A cross section of the second outer housing 5 is formed in a curved shape such that short sides of a rectangle bulge outward. The cross section of the second outer housing 5 may be of the same shape as that of the first outer housing 4.

The front end part of the boot 6 and the rear housing 8 are housed in the second outer housing 5. The second outer housing 5 is provided with four slits 5a with which the claw parts 4a of the first outer housing 4 are engaged. Each of the slits 5a extends backward from a front end of the second outer housing 5 by a given length. The second outer housing 5 is provided with a pair of top and bottom slits 5a on a left side thereof, and is also provided with a pair of top and bottom slits 5a on a right side thereof.

Contact targets 5b with which the contact parts 4b of the first outer housing 4 are brought into contact from the back are provided at front sides of the respective slits 5a. As the contact parts 4b come into contact with the contact targets 5b from the back, the second outer housing 5 and the first outer housing 4 are configured not to be separated over a given interval in the forward/backward direction.

The second outer housing 5 is provided with cutout parts 5c which the front end part of the boot 6 enters. The cutout parts 5c are provided, for example, as a pair of top and bottom cutout parts. The cutout parts 5c are formed to be cut out from the back end surface 5f of the second outer housing 5 in the forward direction. Flat lateral surfaces 5d for which the cutout parts 5c are provided have C shapes whose outer sides are angled.

Step parts 5e with which a back end 3f of the inner housing 3 is brought into contact from the front are provided at inner sides of the respective slits 5a. The step parts 5e protrude inward from an inner surface of the second outer housing 5. As front surfaces of the step parts 5e are brought into contact with the back end 3f from the back by displacing the second outer housing 5 to the front, the second outer housing 5 and the inner housing 3 move forward together.

The rear housing 8 is provided with a tubular insertion part 8a that is inserted into a back side of the inner housing 3, and a cylindrical part 8b that is engaged with the caulking ring 9 at a back side of the insertion part 8a. The insertion part 8a has a shape expanded at a front end of the cylindrical part 8b. In a state in which a front end of the insertion part 8a is in contact with the contact surface 3e of the inner housing 3, the rear housing 8 is engaged with the inner housing 3. An uneven part 8c is formed in an outer circumferential surface of the cylindrical part 8b.

The caulking ring 9 has a stepped cylindrical shape in which a front side thereof is increased in diameter. The caulking ring 9 is increased in diameter in a stepped shape such that an inner diameter follows an outer diameter from the back to the front. The caulking ring 9 is provided with a large diameter part 9a that is located at a front side thereof, and a small diameter part 9b that is located at a back side of the large diameter part 9a. The caulking ring 9 is reduced in diameter, and is engaged with the rear housing 8. Tensile strength fibers or sheaths constituting an optical fiber cord are sandwiched and fixed between the outer circumferential surface of the cylindrical part 8b and an inner circumferential surface of the caulking ring 9. Each optical fiber constituting the optical fiber cord is held inside the caulking ring 9.

The boot 6 has a tubular shape extending in the forward/backward direction. In a state in which the cylindrical part 8b of the rear housing 8 and the caulking ring 9 are housed in the boot 6, the boot 6 is mounted on the caulking ring 9. The boot 6 protects the optical fiber cord such that sharp bending does not occur in the optical fiber cord. The front end of the boot 6 is in contact with a back end of the insertion part 8a of the rear housing 8, and the boot 6 extends backward from this contact portion. In the boot 6, a back side from a portion in which the caulking ring 9 is housed is gradually reduced in diameter toward the back. A plurality of elongated through-holes 6a extending in a circumferential direction of the boot 6 are formed at a portion at which the back side of the boot 6 is reduced in diameter.

The grip part 10 is formed in a round rod shape that extends backward from the back end surface 5f of the second outer housing 5. The grip part 10 is provided with an extension part 10a whose front end is fixed to the back end surface 5f and extends backward, and a columnar handling part 10b that is increased in diameter at a back end of the extension part 10a and further extends from a connecting portion with the extension part 10a.

A back end of the handling part 10b is located behind a back end of the boot 6. That is, one end of the grip part 10 extends up to a position that is more distant from the second outer housing 5 than one end of the boot 6. Therefore, the grip part 10 can be gripped from the more distant position. Since the handling part 10b is increased in diameter (expanded) with respect to the extension part 10a, the handling part 10b has an easily grasped shape. For example, a handler pushes the handling part 10b forward or pulls the handling part 10b backward, and thereby the second outer housing 5 can be displaced forward or backward.

In the present embodiment, the grip part 10 is fixed to the back end surface 5f of the second outer housing 5. However, the grip part 10 may be configured to be freely mounted or demounted with respect to the second outer housing 5, for example, by a screw or the like. In this case, when the grip part 10 is not required, the grip part 10 can also be demounted from the second outer housing 5.

Like the related art, for example, when the first outer housing 4 and the second outer housing 5 are an integrated outer housing, the boot is pushed forward, and thereby the optical connector is mounted on the external optical adapter. The outer housing is displaced backward, and thereby the optical connector is demounted from the optical adapter. In the related art, when the optical connector is mounted on the optical adapter, the boot is gripped to perform the mounting. When the optical connector is demounted from the optical adapter, the outer housing is gripped to perform the demounting. In this way, since a gripping place in the event of the mounting and a gripping place in the event of the demounting are different, there is room for improvement in the aspect of handleability. In contrast, in the optical connector 1 according to the present embodiment, handleability is improved in the mounting or demounting operation for the optical adapter. Hereinafter, an operation when the optical connector 1 mounted or demounted with respect to the optical adapter will be described.

An operation for demounting the optical connector 1 from the optical adapter will be described. The operation for demounting the optical connector 1 from the optical adapter is performed by pulling the grip part 10 backward. When the grip part 10 is pulled backward, the second outer housing 5 moves backward. When the second outer housing 5 moves backward, the contact part 4b of the first outer housing 4 is brought into contact with the contact target 5b of the second outer housing 5. Afterward, the second outer housing 5 moves backward along with the first outer housing 4.

Figure 3:
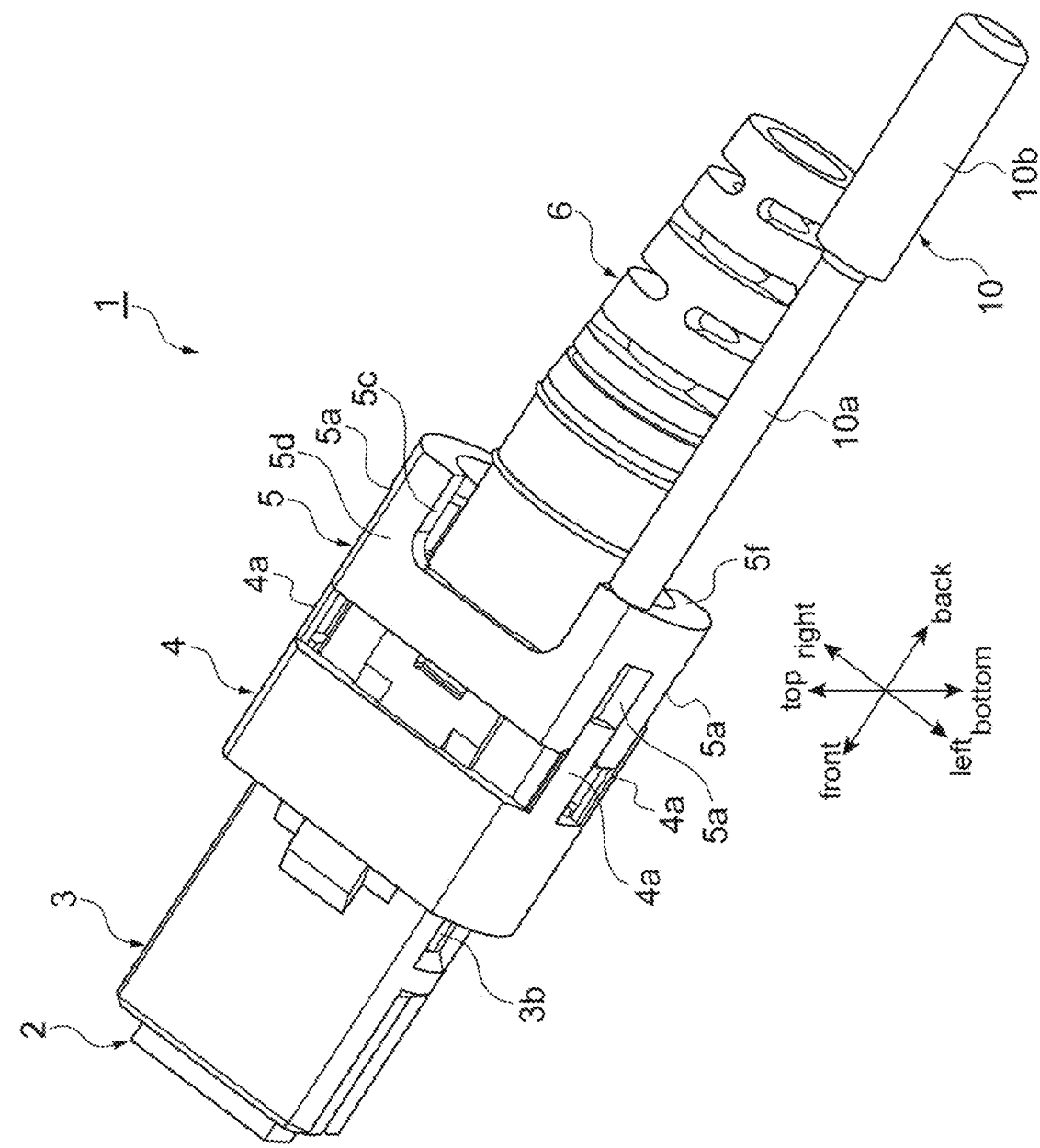
FIG. 3 is a perspective view illustrating a state in which the optical connector of FIG. 1 is pulled out from an optical adapter.
Figure 4:
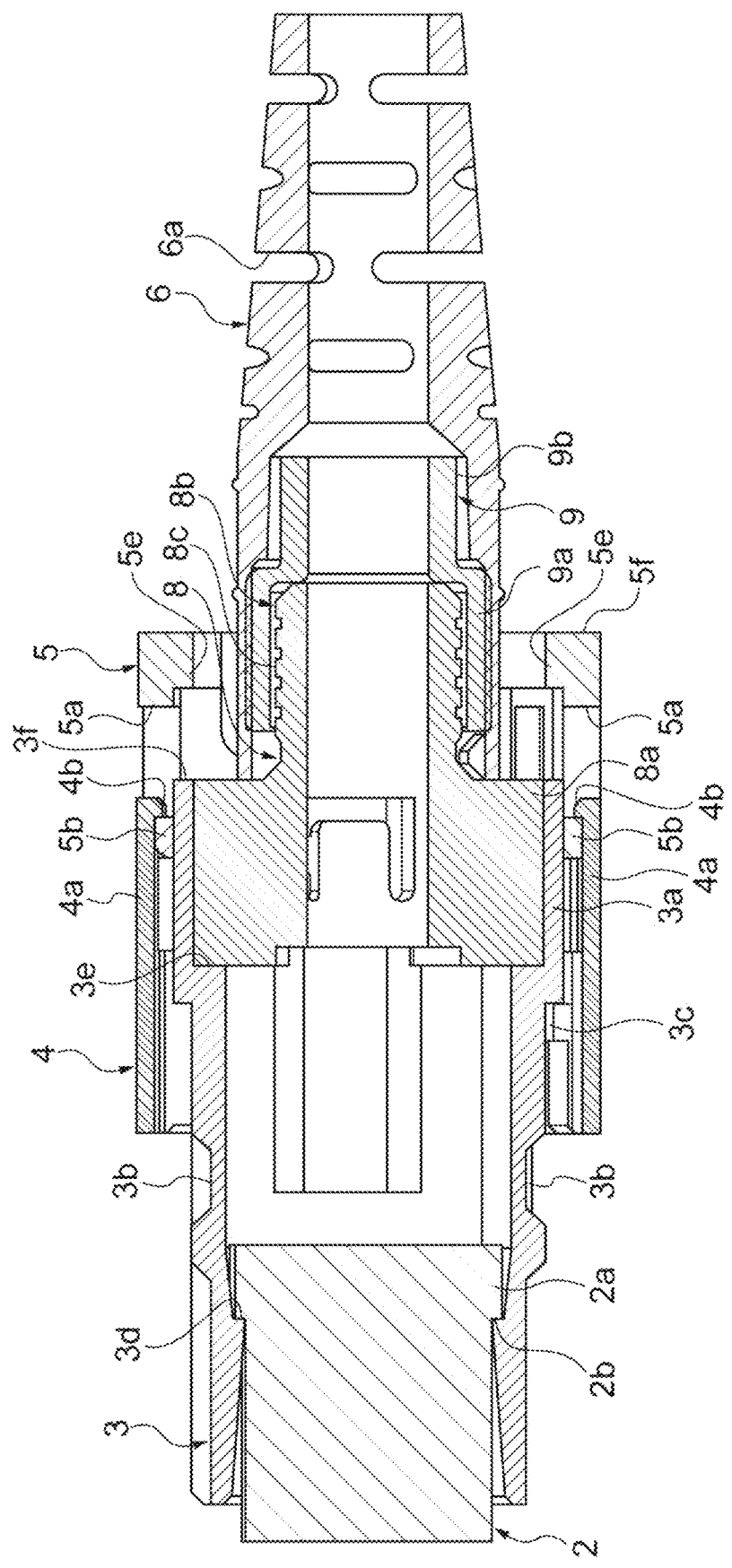
FIG. 4 is a longitudinal sectional view illustrating the optical connector of FIG. 3.

As described above, when the second outer housing 5 moves backward along with the first outer housing 4, the inner housing 3 does not move backward. Therefore, when the second outer housing 5 moves backward along with the first outer housing 4, the engaging holes 3b of the inner housing 3 are exposed as illustrated in FIGS. 3 and 4. At this point, a part of the boot 6 enters the cutout parts 5c of the second outer housing 5. When the grip part 10 is pulled further backward, the latches of the optical adapter for the engaging holes 3b are released. As the inner housing 3 is pulled along with the first outer housing 4, the optical connector 1 can be pulled out from the optical adapter.

Next, an operation for mounting the optical connector 1 on the optical adapter will be described. In a state illustrated in FIGS. 1 and 2, the operation for mounting the optical connector 1 on the optical adapter is performed by pushing the grip part 10 forward. When the grip part 10 is pushed forward, the second outer housing 5 moves forward. When the second outer housing 5 moves forward, the front surface of the step part 5e of the second outer housing 5 is brought into contact with the back end 3f of the inner housing 3. Then, the second outer housing 5 moves forward along with the inner housing 3.

Figure 5:
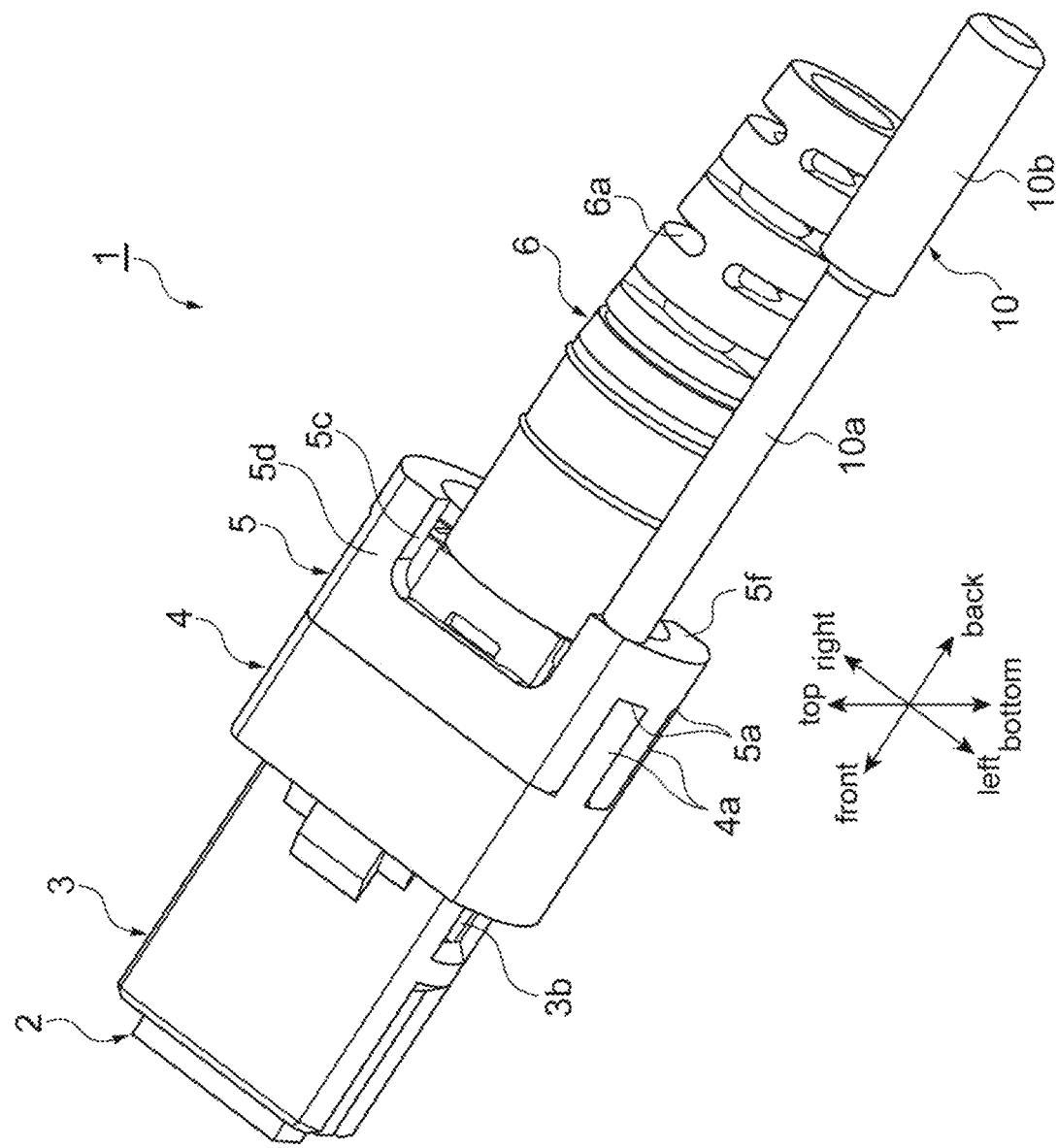
FIG. 5 is a perspective view illustrating a state in which the optical connector of FIG. 1 is plugged into the optical adapter.
Figure 6:
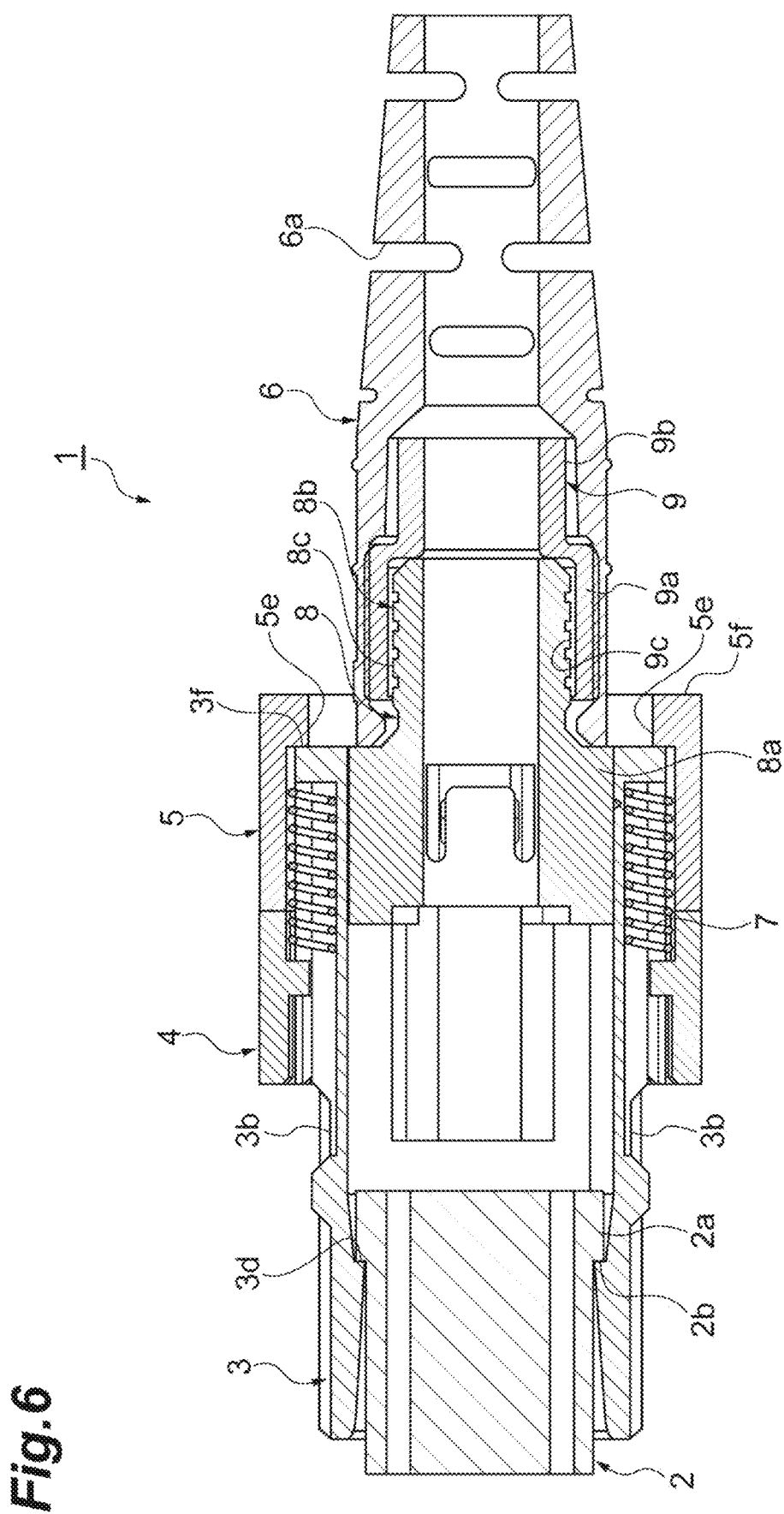
FIG. 6 is a longitudinal sectional view illustrating the optical connector of FIG. 5.

When the second outer housing 5 moves forward along with the inner housing 3, forward movement of the first outer housing 4 is restricted by the latches of the optical adapter. Therefore, the first outer housing 4 does not move forward. When the second outer housing 5 moves forward along with the inner housing 3, the first outer housing 4 relatively moves backward. Afterward, as illustrated in FIGS. 5 and 6, the claw parts 4a of the first outer housing 4 enter up to the back ends of the respective slits 5a. The second outer housing 5 approaches the first outer housing 4 from the back, and the engaging holes 3b begin to be exposed. When the grip part 10 is further pushed forward, the inner housing 3 is also pushed forward. Thereby, the latches of the optical adapter are engaged with the engaging holes 3b of the inner housing 3. When the engagement of the latches is completed, the first outer housing 4, which is biased forward by the coil springs 7 housed in the groove parts 3c of the outer circumference of the inner housing 3, moves forward to cover the latches of the optical adapter and the engaging holes 3b that are engaged. Thereby, the mounting of the optical connector 1 for the optical adapter is completed.

As described above, in the optical connector 1, a part of the boot 6 enters the cutout parts 5c of the second outer housing 5. In this way, as a part of the boot 6 enters the cutout parts 5c, a length of the second outer housing 5 in the forward/backward direction can be reduced.

To normally insert/extract this type of optical connector, the latch parts are exposed to release the latches from a state in which the outer housing covers the latch parts of the optical adapter. The outer housing needs to relatively move in the forward/backward direction relative to the inner housing and the rear housing until the optical connector is completely extracted from the optical adapter. An interval for this relative movement is standardized.

As in the present embodiment, as a part of the boot 6 enters the cutout parts 5c of the second outer housing 5, interference between the back end part of the outer housing (second outer housing 5) and the tip of the boot 6, which is one of the factors that limit an amount of backward movement of the outer housing, can be alleviated. Even when lengths of the inner housing and the rear housing in the forward/backward direction are reduced to that extent, the movement interval of the outer housing can be secured.

As the inner housing and the rear housing are shortened, bending stress and tensile stress that are applied to, particularly, the portions of the inner housing and the rear housing when the optical connector 1 is inserted/extracted or is in a mounted state can be reduced. For this reason, costs of materials or the like can also be reduced. As materials of the inner housing and the rear housing, in addition to polyetherimide (PEI) that is generally used up to now, for example, polybutylene terephthalate (PBT) or polyphenylene sulfide (PPS) having a relative low strength at a lower price can be used. As a material of the first outer housing 4, the second outer housing 5, or the grip part 10, the same material as the inner housing or the rear housing can be used.

In the optical connector 1, the first outer housing 4 and the second outer housing 5 are separately provided, and the second outer housing 5 is configured to be freely movable relative to the first outer housing 4 in the forward/backward direction. When the second outer housing 5 moves forward, the second outer housing 5 and the inner housing 3 move forward together, and the engaging holes 3b are exposed. Therefore, the latches of the optical adapter can be engaged with the engaging holes 3b. When the second outer housing 5 moves backward, the second outer housing 5 and the first outer housing 4 move backward together, and the engaging holes 3b are exposed. Therefore, as the engagement of the optical adapter in the engaging holes 3b is released, the optical connector 1 can be demounted from the optical adapter.

In this way, since the mounting/demounting of the optical connector 1 on/from the optical adapter can be performed by merely displacing the second outer housing 5 in the forward/backward direction, the operability of the mounting/demounting can be improved. Since the grip part 10 extending in the direction away from the second outer housing 5 is provided, the grip part 10 is gripped and handled, and thereby the second outer housing 5 can be displaced from a more distant place. Since the second outer housing 5 can be displaced by the grip part 10, the mounting/demounting for the optical adapter can be more easily performed. Since the gripped place when the optical connector 1 is mounted and the gripped place when the optical connector 1 is demounted can be provided as the same grip part 10, handleability can be improved.

Second Embodiment

In the aforementioned first embodiment, the first outer housing 4 and the second outer housing 5 which are separated from each other are provided. In contrast, an optical connector 21 according to a second embodiment is provided with one outer housing 24 illustrated in FIGS. 7 and 8 in place of the outer housings 4 and 5.

Figure 7:
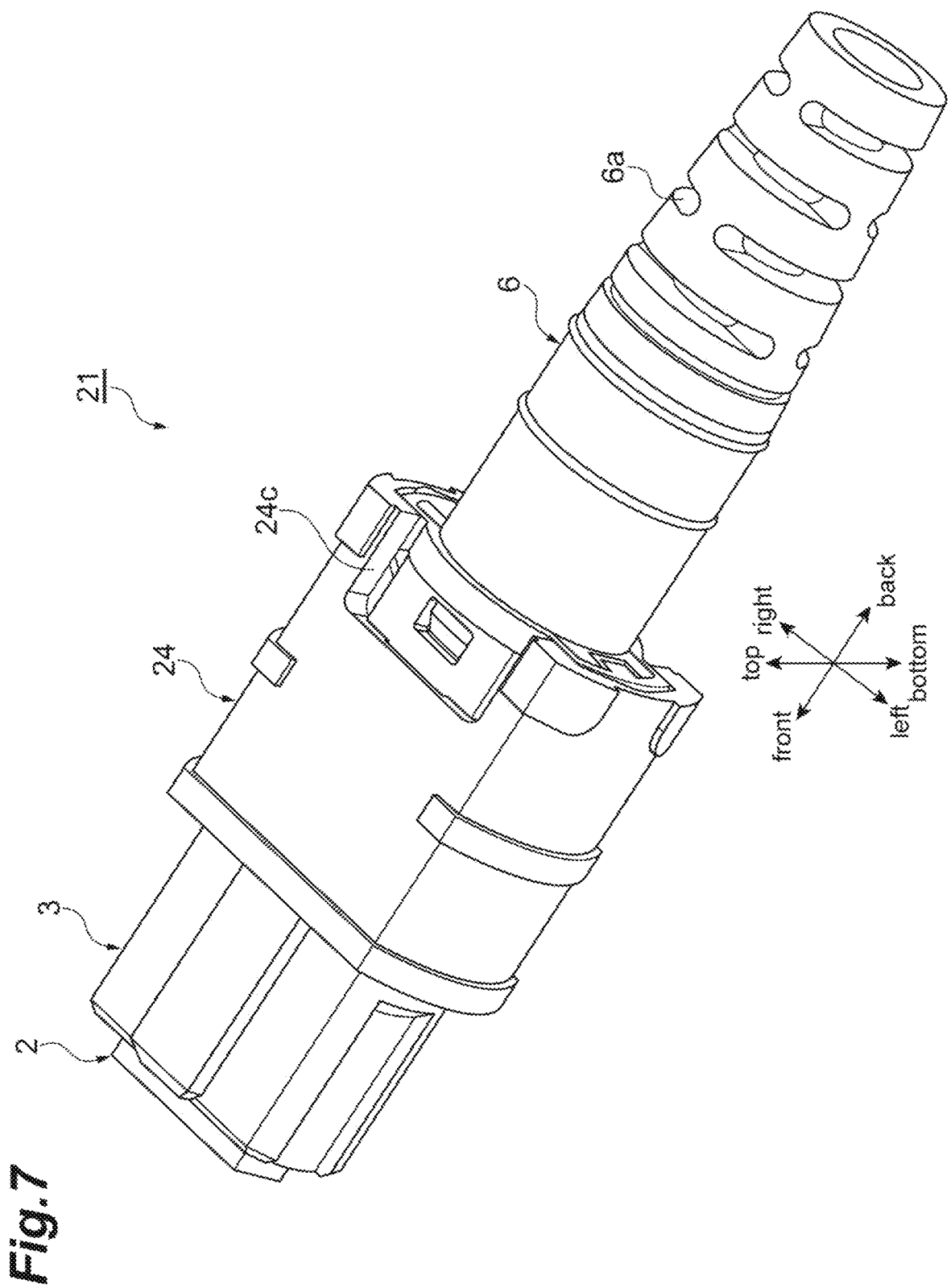
FIG. 7 is a perspective view illustrating an optical connector according to a second embodiment.
Figure 8:
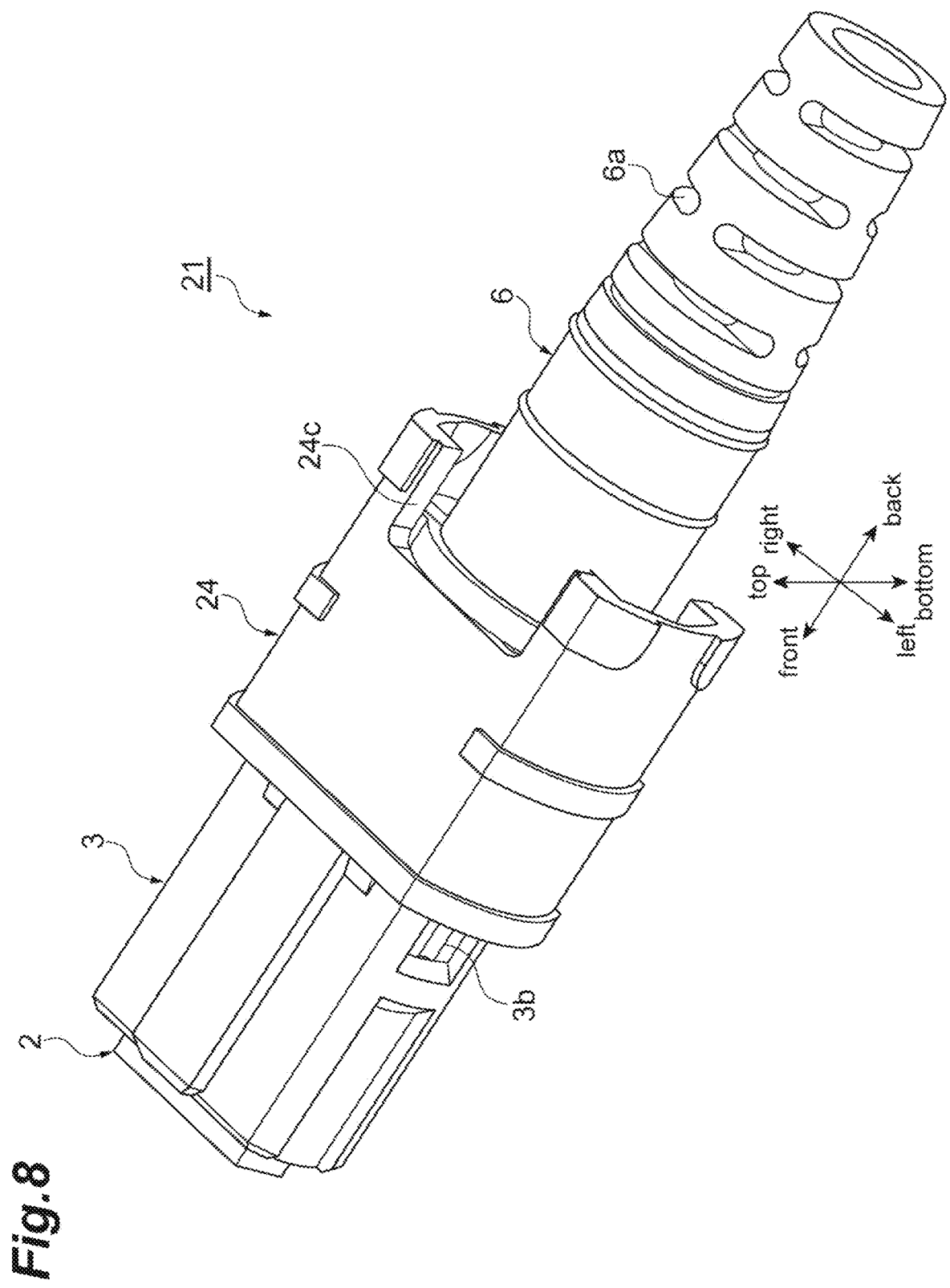
FIG. 8 is a perspective view illustrating a state in which the optical connector of FIG. 7 is pulled out from an optical adapter.

As illustrated in FIGS. 7 and 8, the optical connector 21 is provided with a ferrule 2, an inner housing 3, and a boot 6 like the optical connector 1. The outer housing 24 is mounted to be freely movable relative to the inner housing 3 in a forward/backward direction. Like the second outer housing 5, the outer housing 24 is provided with cutout parts 24c that are cut out forward. A front end part of the boot 6 enters the cutout parts 24c.

In the optical connector 21, like the optical connector 1 of the first embodiment, a part of the boot 6 enters the cutout parts 24c. Therefore, in the optical connector 21, like the optical connector 1, the inner housing and a rear housing can be shortened, shortening of the optical connector 21 can be realized, and costs of materials or the like can be reduced.

Third Embodiment

Next, an optical connector 31 according to a third embodiment will be described with reference to FIGS. 9 to 12. The optical connector 31 is different from that of the first embodiment in that it is provided with a grip part 40 mounted/demounted freely and it is provided with a third outer housing 45 having notches 45a with which the grip part 40 is engaged. In the third embodiment, the third outer housing 45 is provided in place of the second outer housing 5 of the first embodiment. Hereinafter, description overlapping the first embodiment will be omitted.

Figure 9:
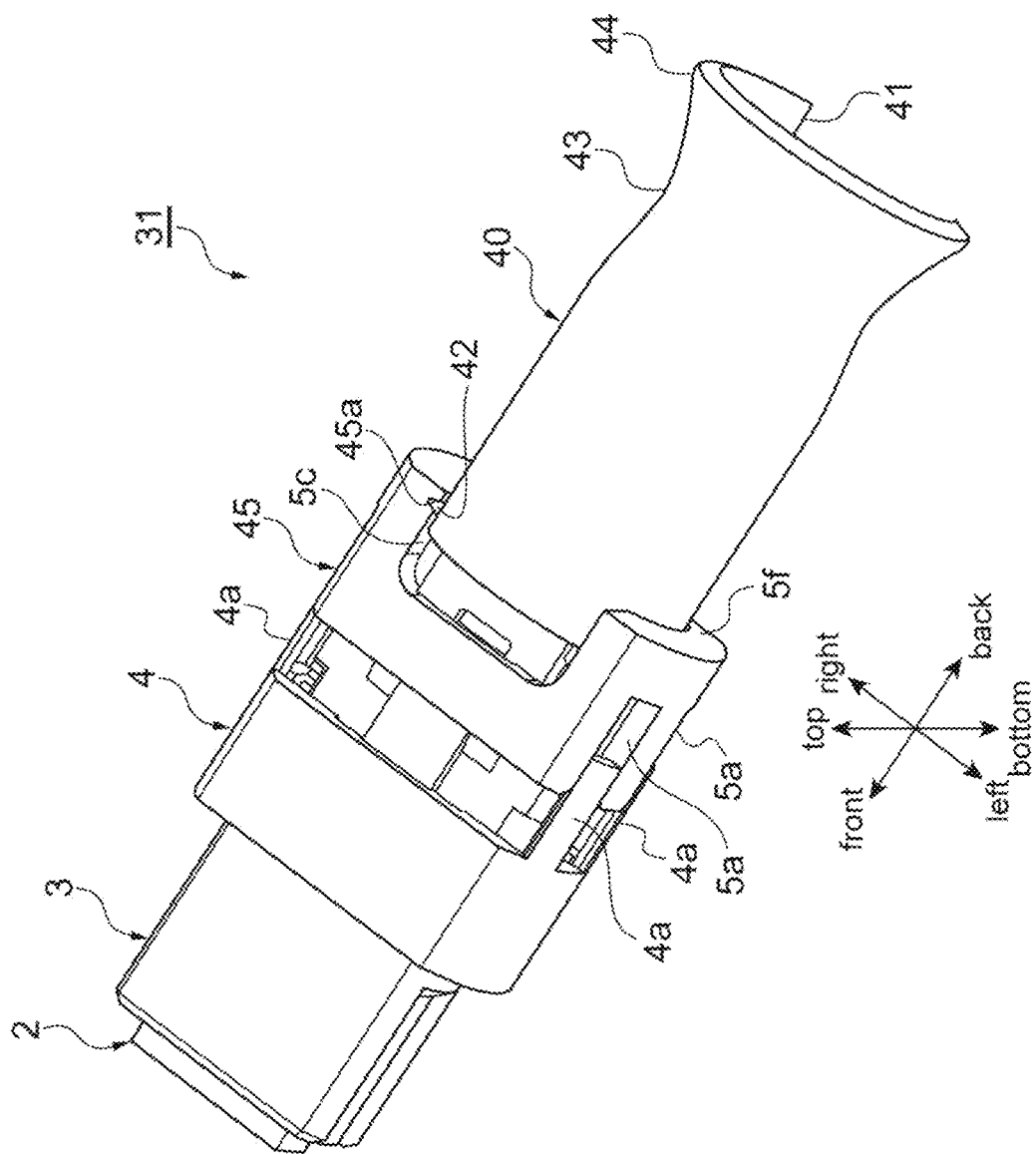
FIG. 9 is a perspective view illustrating an optical connector according to a third embodiment.
Figure 10:
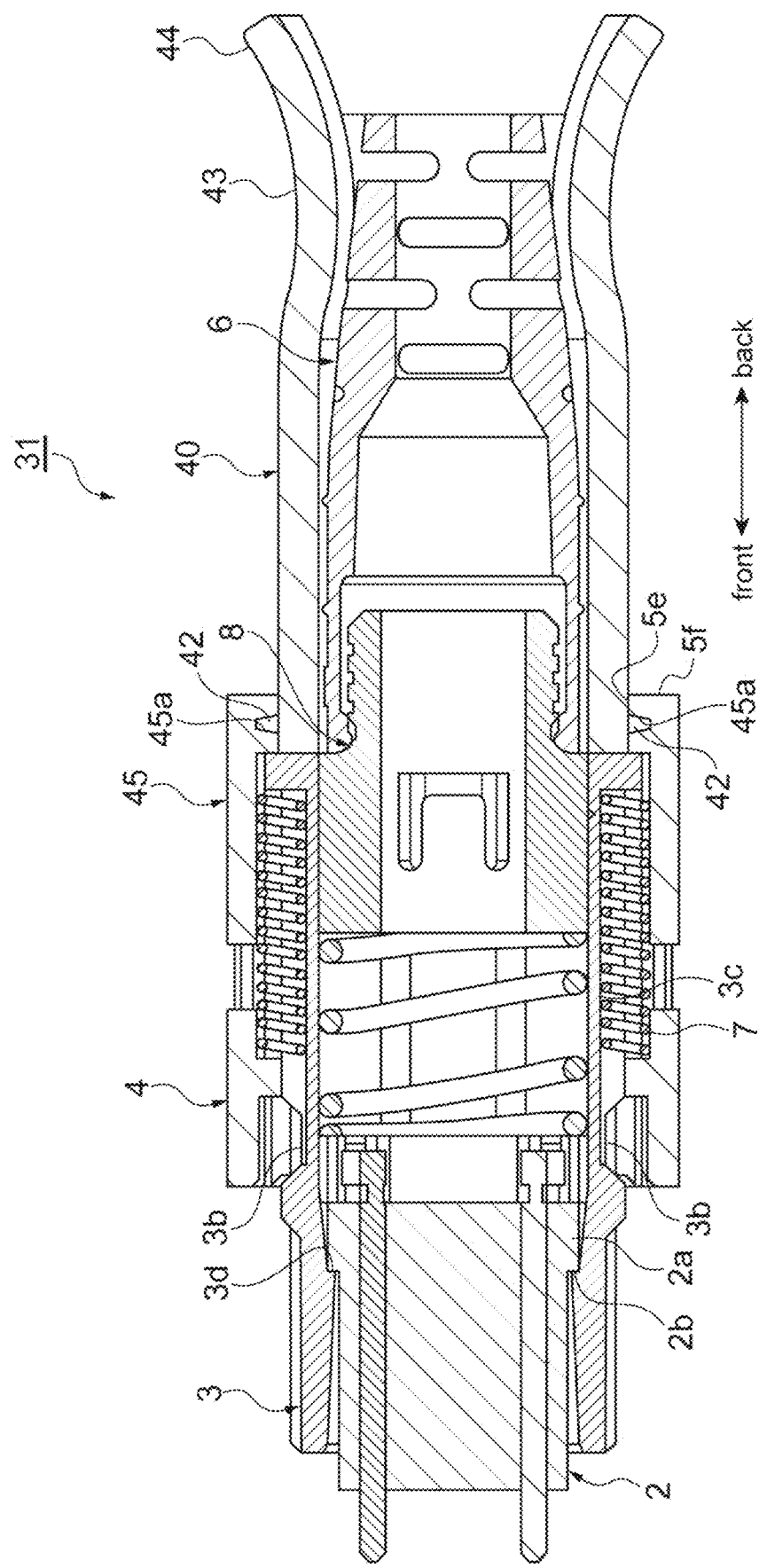
FIG. 10 is a longitudinal sectional view illustrating the optical connector of FIG. 9.
Figure 11:
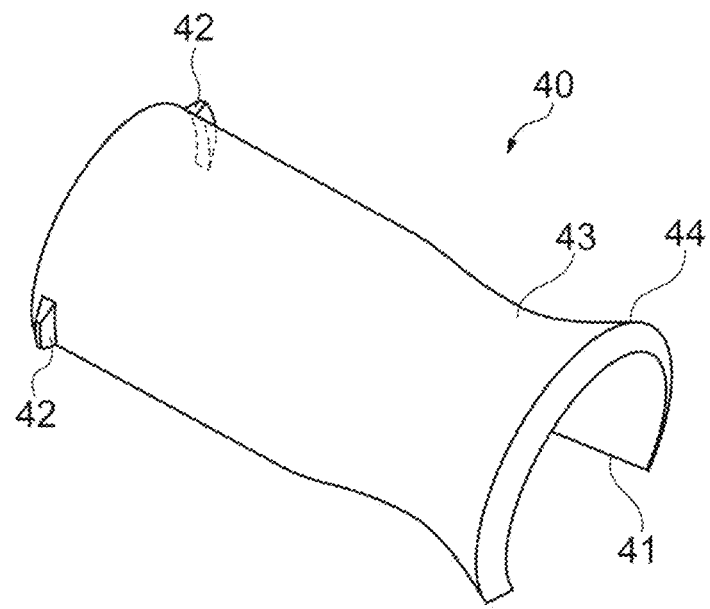
Figure 11:
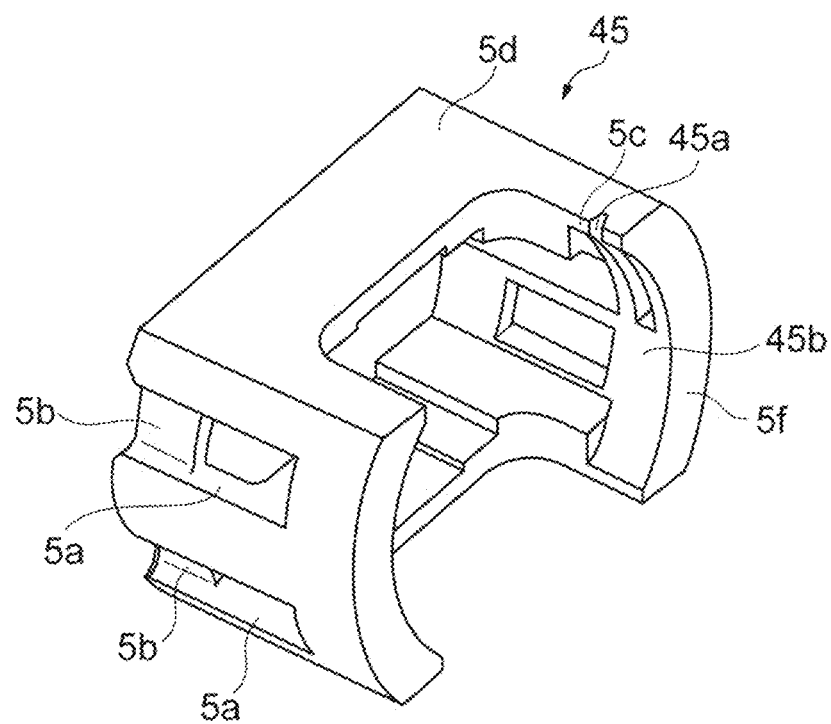

As illustrated in FIGS. 9, 10 and 11, the grip part 40 is turned relative to the third outer housing 45 on a plane perpendicular to the forward/backward direction, and thereby is freely mounted/demounted on/from the third outer housing 45. The grip part 40 has a shape (a vertically divided cylindrical shape) in which a part of a cylinder is cut out in the forward/backward direction (a direction in which a rotational axis of the grip part 40 extends). The grip part 40 is provided with cutout parts 41 extending in the forward/backward direction. When the grip part 40 is cut along the plane perpendicular to the forward/backward direction, a shape thereof has a circular arc shape. This circular arc extends, for example, about two thirds of the entire circumference (in which a central angle of the circular arc portion is about 120°). As these cutout parts 41 are provided, a part of the boot 6 is configured to be covered sideways (in a direction perpendicular to the rotational axis of the grip part 40) with respect to the optical connector that has already been mounted on the optical fiber cord, and the grip part 40 is inserted, advanced, and turned. Thereby, the grip part 40 can be mounted from the back. Alternatively, the grip part 40 can be mounted with respect to the optical connector that is in a state connected with another optical connector without releasing the connected state.

A pair of protrusion parts 42 engaged with the notches 45a are provided on a surface of one end of the grip part 40 in the forward/backward direction. The protrusion parts 42 function as engaging parts that are engaged with the third outer housing 45 in the forward/backward direction. Each of the protrusion parts 42 extends in a circumferential direction of the grip part 40. The two protrusion parts 42 are provided, for example, at positions that are symmetrical with respect to the center of rotation of the grip part 40.

The grip part 40 is provided with a diameter reduced part 43 at a place away from the protrusion parts 42 in the forward/backward direction. The grip part 40 has an easily gripped shape by means of this diameter reduced part 43. A diameter increased part 44 gradually increased in diameter from the diameter reduced part 43 is provided for an end part of the grip part 40 which is on the opposite side of the protrusion parts 42.

The notches 45a of the third outer housing 45 are provided at an inner side (a front side) of a back end surface 5f. The notches 45a are engaged parts engaged with the protrusion parts 42 in the forward/backward direction. The notches 45a are formed along a curved inner surface 45b of the third outer housing 45. The notches 45a are formed at two places in the third outer housing 45. The two notches 45a are provided at positions at which the cutout parts 5c are sandwiched from both sides. Each of the notches 45a has a groove shape that extends from each lateral surface 5d of the third outer housing 45 in a rotating direction of the grip part 40. The two notches 45a are disposed at the positions that are symmetrical with respect to the center of rotation of the grip part 40.

Figure 12:
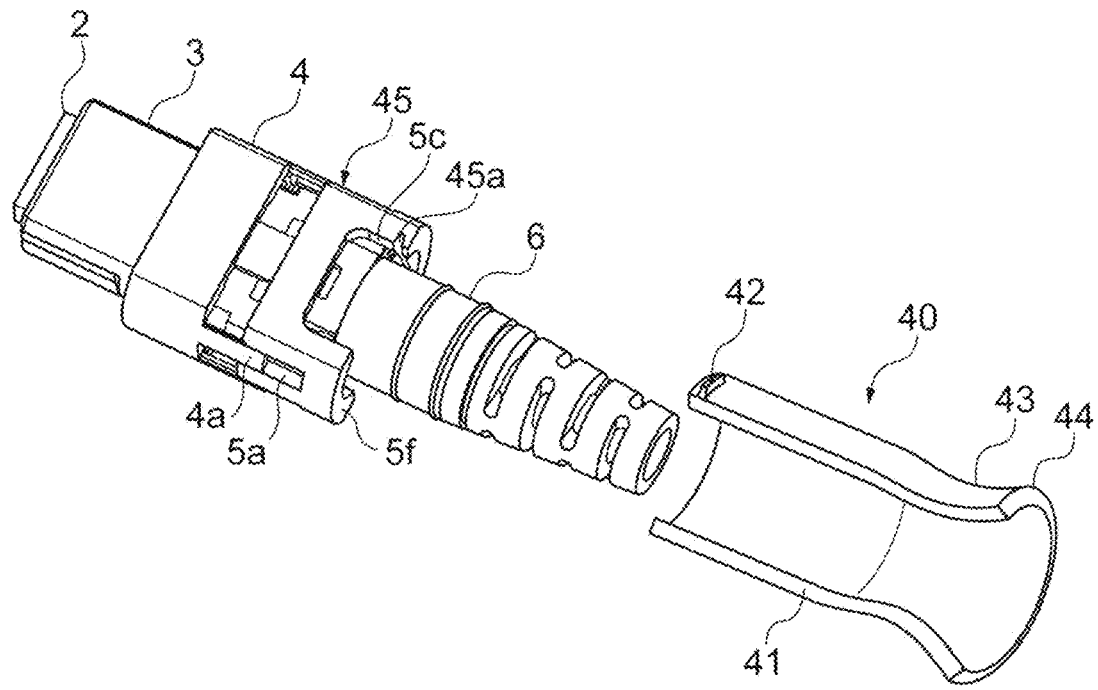
Figure 12:
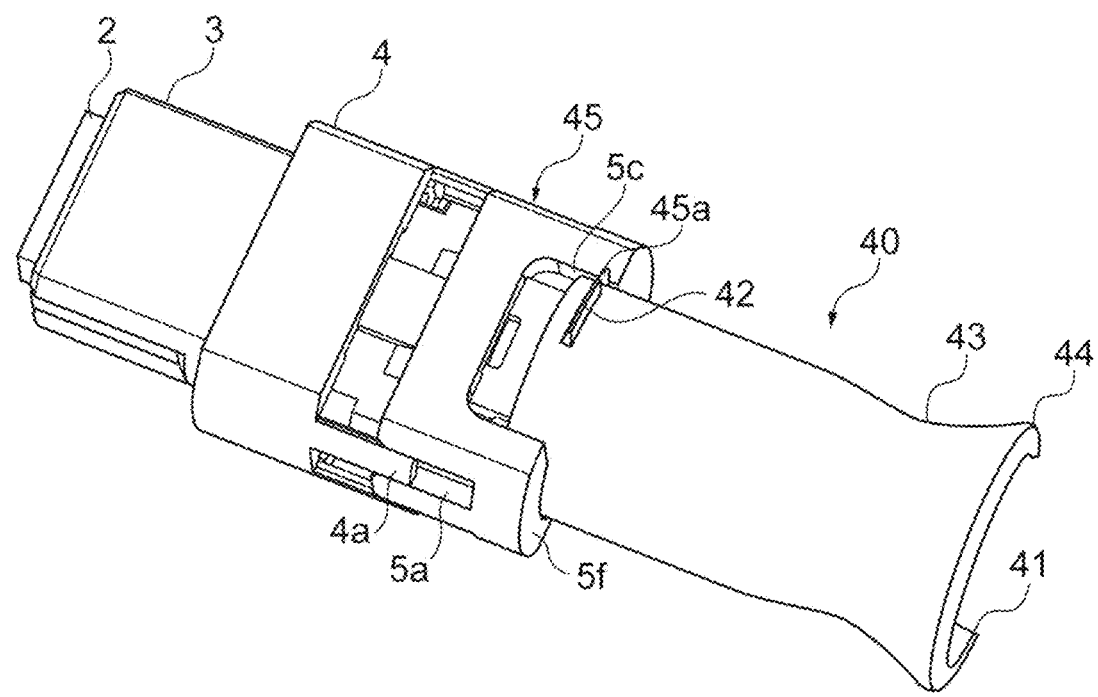

A method of mounting/demounting the grip part 40 on/from the third outer housing 45 will be described with reference to FIG. 12. First, a method of causing the grip part 40 to be engaged with the third outer housing 45 will be described. As illustrated in FIG. 12, the grip part 40 is disposed such that the protrusion parts 42 face the front, and a part of the boot 6 is covered sideways by the grip part 40.

The protrusion parts 42 are inserted into the cutout parts 5c from the back. In the state in which the protrusion parts 42 are inserted into the cutout parts 5c, the grip part 40 is turned in a rotating direction (for example, in a clockwise direction). Thereby, the protrusion parts 42 enter the notches 45a, and the grip part 40 and the third outer housing 45 are engaged in the forward/backward direction. In this state, as the grip part 40 is pushed forward, the third outer housing 45 can be displaced forward. As the grip part 40 is pulled backward, the third outer housing 45 can be displaced backward.

A method of demounting the grip part 40 from the third outer housing 45 is the reverse of the method of causing the grip part 40 to be engaged with the third outer housing 45. That is, the engagement of the protrusion parts 42 with respect to the notches 45a is released by turning the grip part 40 in a rotating direction opposite to the above (for example, in a counterclockwise direction). Afterward, the grip part 40 can be demounted from the third outer housing 45 by merely pulling the grip part 40 from the third outer housing 45 to the back.

In the optical connector 31 according to the third embodiment, the grip part 40 can be engaged with the third outer housing 45 in the forward/backward direction. Depending on this engagement, the grip part 40 can be mounted on the third outer housing 45, and the mounted grip part 40 can be gripped to easily displace the third outer housing 45 in the forward/backward direction. The notches 45a of the third outer housing 45 are provided on both of the left and right sides of the cutout parts 5c which the boot 6 enters. Therefore, the grip part 40 mounted on the third outer housing 45 can be pushed or pulled in a well-balanced manner. Accordingly, the mounting/demounting operation of the optical connector 31 on/from the optical adapter can be more smoothly performed.

Although the embodiments of the present invention have been described, the present invention is not limited to the above embodiments, and can be modified in various ways without departing the spirit of the present invention. For example, the present invention can also be widely applied to various optical connectors for a multiple core or a single core. Each of the aforementioned optical connectors may be a so-called on-site mounted optical connector that is assembled to the optical fiber cord in the field.

In the first embodiment, the four claw parts 4a are provided at the back of the first outer housing 4, and the first outer housing 4 is provided with the pair of top and bottom claw parts 4a on the left side, and is also provided with the pair of top and bottom claw parts 4a on the right side. However, the number, the arrangement mode, and the shape of the claw parts 4a can be appropriately modified. The number, the arrangement mode, and the shape of the slits 5a of the second outer housing 5 can also be appropriately modified. In place of the first outer housing 4 provided with the claw parts 4a and the second outer housing 5 provided with the slits 5a, the first outer housing provided with the slits and the second outer housing provided with the claw parts may be used.

In the third embodiment, the grip part 40 is provided with the two protrusion parts 42, the third outer housing 45 is provided with the two notches 45a, and the protrusion parts 42 and the notches 45a are disposed at the positions that are symmetrical with respect to the center of rotation of the grip part 40. However, the arrangement positions of the protrusion parts 42 and the notches 45a are not limited to the above, and can be appropriately modified. The shape of the grip part 40 can also be appropriately modified. The grip part 40 may be provided with the two notches, and the third outer housing 45 may be provided with the two protrusion parts.

The optical connector 31 according to the third embodiment may be provided with one outer housing, in place of the outer housings 4 and 45 illustrated in FIGS. 7 and 8. In the optical connector 31 according to the third embodiment, the cutout parts 5c can be omitted. For example, in place of the cutout parts 5c, thin parts made thinner than a thickness of the back end surface 5f may be provided. A structure in which the cutout parts 5c are omitted and the grip part 40 is pushed and fitted into the third outer housing 45 may be adopted. A structure in which the cutout parts 5c are omitted, threads are formed at the grip part 40 and the third outer housing 45, and the grip part 40 is screwed to the third outer housing 45 may be adopted.

INDUSTRIAL APPLICABILITY

The present invention can be used as an optical connector capable of realizing a reduction in length.

REFERENCE SIGNS LIST 1, 21, 31: Optical connector
2: Ferrule
2a: Expansion part
2b: Front surface
3: Inner housing
3a: Expansion part
3b: Engaging hole (engaging part)
3c: Groove part
3d, 3e: Contact surface
3f: Back end
4: First outer housing
4a: Claw part
4b: Contact part
5: Second outer housing
5a: Slit
5b: Contact target
5c, 24c: Cutout part
5d: Lateral surface
5e: Step part
5f: Back end surface
6: Boot
6a: Through-hole
7: Coil spring
8: Rear housing
8a: Insertion part
8b: Cylindrical part
8c: Uneven part
9: Caulking ring
9a: Large diameter part
9b: Small diameter part
10, 40: Grip part
10a: Extension part 10b: Handling part
24: Outer housing
41: Cutout part
42: Protrusion part (engaging part)
43: Diameter reduced part
44: Diameter increased part
45: Third outer housing (second outer housing)
45a: Notch (engaged part)
45b: Inner surface

The invention claimed is:

1. An optical connector connected to an external optical adapter in a given connecting direction, the optical connector comprising:
   an inner housing, on a surface of which engaging parts for engaging the optical adapter are provided;
   a boot connected to the inner housing in the connecting direction on a side opposite the optical adapter;
   an outer housing configured to cover the engaging parts and mounted on the inner housing to be freely movable in the connecting direction; and
   a grip part extending from the outer housing in the connecting direction,
   wherein the engaging parts are exposed as the outer housing moves to the boot side in the connecting direction,
   the outer housing includes a first outer housing configured to cover the engaging parts, and a second outer housing provided on the boot side of the first outer housing and provided to be freely movable relative to the first outer housing in the connecting direction,
   when the second outer housing moves in a direction approaching the first outer housing, the second outer housing and the inner housing relatively move relative to the first outer housing, and thereby the engaging parts are exposed,
   when the second outer housing moves away from the first outer housing, the second outer housing and the first outer housing relatively move relative to the inner housing, and thereby the engaging parts are exposed,
   the second outer housing has cutout parts which are cut out in the connecting direction from an end part of the boot side and which a part of the boot enters,
   the second outer housing includes two notches provided on both sides of the cutout parts in a circumferential direction, the two notches being formed on a curved inner surface of the second outer housing,
   the grip part has a circular arc shape outer surface in cross section perpendicular to the connecting direction,
   the grip part includes two protrusion parts formed on the curved arc shape outer surface of the grip part,
   the two protrusion parts of the grip part engage with the two notches of the second outer housing by rotation about a longitudinal rotational axis of the grip part,
   the grip part covers a portion of the boot, and
   the grip part is freely mounted/demounted on/from the second outer housing by rotation about the longitudinal rotational axis of the grip part.

2. The optical connector according to claim 1, wherein the grip part includes a diameter reduced part whose diameter is smaller than surrounding portions, and a diameter increased part whose diameter is gradually increased from the diameter reduced part.

3. The optical connector according to claim 1, wherein the first outer housing has one of claw parts and slits, and the second outer housing has the other of the claw parts and the slits; and
the second outer housing is configured to be freely movable relative to the first outer housing in a state in which the claw parts are engaged with the slits.

4. The optical connector according to claim 1, wherein the grip part has a cutout part extending along the longitudinal rotational axis of the grip part, and
the boot is exposed through the cutout part of the grip part.

* * * * *